US008108187B2

(12) United States Patent
Brown (10) Patent No.: US 8,108,187 B2
(45) Date of Patent: Jan. 31, 2012

(54) METHOD AND SYSTEM FOR SURFACE ANALYSIS AND ENVELOPE GENERATION

(76) Inventor: David C. Brown, Chicago, IL (US)

( * ) Notice: Subject to any disclaimer, the term of this patent is extended or adjusted under 35 U.S.C. 154(b) by 1041 days.

(21) Appl. No.: 11/970,757

(22) Filed: Jan. 8, 2008

(65) Prior Publication Data

US 2009/0174720 A1    Jul. 9, 2009

(51) Int. Cl.
*G06G 7/48* (2006.01)
(52) U.S. Cl. .......................................... 703/6; 345/421
(58) Field of Classification Search ........ 703/6; 345/581, 345/421; 378/149; 700/220, 221; 53/50, 53/154
See application file for complete search history.

(56) References Cited

U.S. PATENT DOCUMENTS

| | | | |
|---|---|---|---|
| 4,375,674 A | 3/1983 | Thornton | |
| 5,771,310 A | 6/1998 | Vannah | |
| 5,835,095 A | 11/1998 | Smith et al. | |
| 6,151,404 A | 11/2000 | Pieper | |
| 6,489,955 B1 | 12/2002 | Newhall, Jr. | |
| 6,714,901 B1 * | 3/2004 | Cotin et al. | 703/7 |
| 7,099,734 B2 | 8/2006 | Pieper et al. | |
| 7,100,608 B2 | 9/2006 | Brewer et al. | |
| 2004/0093105 A1 | 5/2004 | Holloway et al. | |
| 2005/0084140 A1 * | 4/2005 | Kakadiaris et al. | 382/118 |
| 2006/0283461 A1 | 12/2006 | Lubke et al. | |
| 2007/0047774 A1 | 3/2007 | Yukhin et al. | |
| 2007/0053585 A1 | 3/2007 | Xiao et al. | |
| 2007/0075994 A1 * | 4/2007 | Fossum et al. | 345/419 |
| 2007/0076954 A1 | 4/2007 | Terakawa | |

OTHER PUBLICATIONS

Don-Hee Han, et al., Development of Prototypes of Half-Mask Facepieces for Koreans Using the 3D Digitizing Design Method: A Pilot Study, Annals of Occupational Hygiene, vol. 48, Oxford University Press, Oct. 27, 2004.
Ben Azouz, et al., Automatic Locating of Anthropometric Landmarks on 3D Human Models, symposium, Jun. 2006, National Research Council of Canada, Canada.
Harold Alexander, Final Report on the NASA Headquarters Grant on Space Engineering, report, Oct. 29, 1991, Massachusetts Institute of Technology, U.S.A.
Charles McKinley, Anthropometric Program Analysis of Reach and Body Movement, report, Aug. 14, 1981, National Aeronautics and Space Administration, U.S.A.
Jennifer Whitestone, et al., Integrate 1.28: A Software Tool for Visualizing, Analyzing, and Manipulating Three-Dimensional Data, interim report, Jan. 1998, Human Effectiveness Directorate, USA.
Integrate 2.8: A New Generation Three-Dimensional Visualization, Analysis, and Manipulation Utility, operating instructions, developed in 1997.
Ian Greenshields, Gross Computed Surface Anthropometry from 3D Datasets, symposium, 2004, IEEE Symposium on Computer-Based Medical Systems.

(Continued)

*Primary Examiner* — Paul Rodriguez
*Assistant Examiner* — Bernard E Cothran
(74) *Attorney, Agent, or Firm* — Beem Patent Law Firm (57) ABSTRACT

A method and system of surface analysis or product design comprising using a plurality of input scans, commonly orienting the scans, establishing a common origin, creating a ray mesh having a plurality of rays extending from the origin, calculating intersections of the rays with the input scans, analyzing the intersection along each ray, generating percentile envelopes by connecting similar percentile points on each ray, and designing products using percentile envelopes as a guide. The system may comprise a device for scanning surfaces, a fit plan setting forth predetermined guidelines for the product, a coordinate transformation algorithm, an envelope processor comprising an intersection calculation algorithm for analyzing data sets and generating output surfaces, and an output file.

20 Claims, 6 Drawing Sheets

OTHER PUBLICATIONS

Sheryl Cosing, Department of Defense Human Factors Engineering Technical Advisory Group, draft minutes of meeting, Nov. 2002, USA.

John Kolar, Craniofacial Anthropometry: Practical Measurement of the Head and Face for Clinical, Surgical and Research Use, description, 1996, Charles C. Thomas Publisher, Ltd., USA.

Sandy Ressler, et al., A Web3D Based CAESAR Viewer, paper, 2002, CARS/Springer.

Stephen Addleman, Defense Logistics Agency Apparel Research Network (ARN) Program Automating Information Extraction from Three-Dimensional Scan Data, Technical Report, Nov. 27, 1999, Cyberware, USA.

Brett Allen, et al., Exploring the space of human body shapes: data-driven synthesis under anthropometric control, paper, 2004, SAE International.

Brett Allen, et al., The space of human body shapes: reconstruction and parameterization from range scans, paper, Jul. 2003, ACM SIGGRAPHS, USA.

Bruce Bradtmiller, et al., A Head-and-Face Anthropometric Survey of U.S. Respirator Users, final report, May 28, 2004, Anthrotech.

R.O. Bennett, Wireframe Analysis of driver leg-movement space: WIREFRAM user and programmer guides, Jul. 15, 1992, University of Michigan, Ann Arbor, Transportation Research Institute, Ann Arbor, USA.

Josephine Clark Weeden, Three Dimensional Analysis of Facial Movement in Normal Adults: Influence of Sex and Facial Shape, The Angle Orthodontist, 2001, vol. 71, No. 2, pp. 132-140.

Assessment of the NIOSH Head and Face Anthropometric Survey of U.S. Respirator Users, prepublication copy, 2007, The National Academies Press, Washington, D.C., USA.

Nadia Magnenat-Thalmann, et al., Automatic Modeling of Virtual Humans and Body Clothing, 19 J. Comp. Science & Tech. 575-584, 2004, Geneva.

Nageswara Uppu, Effects on Pressure Suit and Race on Functional Reach, Static and Dynamic Strength, thesis, Dec. 2004.

Lei Yang, et al., Racial Differences in Respirator Fit Testing: A Pilot Study of Whether American Fit Panels are Representative of Chinese Faces, Abstract, Sep. 29, 2006, Oxford University Press.

DDFG-T2/P5: Automate Information Extraction from Scan Data, DLA-ARN Final Report, Nov. 18, 1998.

Joseph Young, Head and Face Anthropometry of Adult U.S. Citizens, report, Jul. 1993, Beta Research, Inc., U.S.A.

Ziqin Zhuang, Anthropometric Survey of Respirator Users, Study Protocol, Oct. 2001, National Institute for Occupational Health and Safety.

Pierre Meunier, et al., Helmet Accommodation Analysis using 3D laser scanning, Applied Ergonomics, Abstract, Aug. 1, 2000, vol. 31, Issue 4, Ontario, Canada.

Channa P. Witanaa, et al., Foot measurements from three-dimensional scans: A comparison and evaluation of different methods, International Journal of Industrial Ergonomics, Abstract, Sep. 2006, vol. 36, Issue 9, Hong Kong.

Miyo Yokota, Head and Facial Anthropometry of mixed-races US Army male soldiers for military design and sizing: A pilot study, Applied Ergonomics, Abstract, May 2005, vol. 36, Issue 3, Natick, USA.

Zigin Zhuang, A Head-and-Face Anthropometric Survey of U.S. Respirator Users; final report, May 2008, 2004.

* cited by examiner

METHOD AND SYSTEM FOR SURFACE ANALYSIS AND ENVELOPE GENERATION

BACKGROUND OF THE INVENTION

1. Field of the Invention

The present invention is related to a method and system in the science of three-dimensional surface anthropometry and its application to product design.

2. Description of the Related Prior Art

Anthropometry is the study and measurement of human form. Traditionally, anthropometry has involved the manual location of landmarks on the human form, measuring one-dimensional distances between landmarks, and analyzing those measurements with statistical methods.

Anthropometry has practical applications in the design of work environments and in the custom-fitting of products to the human body, for example, by referring to lists of measurements, such as the length of an arm or the width of the head. Such information is usually available for various percentiles, allowing it to be used to design a product that may accommodate some definable portion of the population. These methods are useful, but are inadequate for products that need to fit to conform to surface contours of the body.

For many years, product designers have used whatever anthropometrical data was available to them to design products to fit users. Sometimes this has involved using poseable human figures, both large and small, in drawings of products, to verify reach, lines of site, etc. Designers also refer to anthropometric data to ensure that handles will fit users' hands, that helmets will fit the largest and smallest sample heads, etc. When designing products like respirators that are required to seal against a user's face, designers are often forced into a trial and error process to devise contours that will fit their intended population of users.

One design method that has been employed involves using a model head or mannequin that is somehow representative of users. This might be a so-called "average head" such as the Alderson head model. Designing is this way may be problematic for many reasons, but especially because it does not account for the extremes in size variations of a population.

Designers may also attempt to find representative users with more extreme proportions, but it may be difficult to anticipate what features may become limiting or otherwise significant when the relationship between the product and wearer is complex. In most cases products are optimized to fit a very small sample of users and then tested to demonstrate that for most other users they fit "well enough." Often deficiencies in fit are not realized until far into the development process, when rigorous fit testing can be done using prototypes on large numbers of subjects.

Many products are intended for use in countries other than those in which they were designed, making it even more difficult to identify fit problems early in the process. In addition, in some countries where products are designed for the country's populace, the demographics of the population are changing quickly enough that products that used to fit their intended users no longer do.

Today, most products are designed using 3D computer software. Computer Aided Design, or CAD, software represents the three-dimensional forms of parts and their interrelationships in great detail. Three-dimensional databases of measurements can be used to analyze the structural and mechanical properties of a product and may also be used to make realistic working models of the product. Further down the line in the process, the CAD representations may be used in the manufacture of the product itself.

Efforts have been made to incorporate three-dimensional scanning and computers into the design process. These efforts may generally be referred to as Three Dimensional Surface Anthropometry, in which laser scanners are used to generate accurate three-dimensional surface models of people of various shapes and sizes.

When 3D laser scanning machines became available in the 1980s, a number of researchers began scanning the human form and attempting to use the data to fit products to intended users. Most of these efforts were focused on the human head, and the applications were mostly for military products. Typically, these efforts involved comparing product geometry to numerous scanned individuals, which is basically the digital equivalent of fitting the product to many individual test subjects, or to having a colleague from "down the hall" try on your prototype. Product design in this manner is a very time consuming process if done right, and, more often than not, relies on only a limited set of individuals being tested.

In the late 1990s a large number of subjects from the United States and Europe were scanned as part of an effort known as the Civilian American and European Surface Anthropometry Resource, or CAESAR project. The project was funded by large corporations hoping to use the data to develop products that fit users better. The CAESAR project, however, focused on data collection and not manipulation or product design.

It would be desirable to create a method and system that overcome one or more shortcomings in the prior art and take advantage of the potential benefits presented by digital anthropometric scanning.

BRIEF SUMMARY OF THE INVENTION

The invention may be particularly useful for products intended to fit the human head and face, such as respirators, gas masks, diving masks, sleep apnea nose cups, helmets, etc. Products designed according to the method may also be applied to other anatomical parts, such as feet, and internal structures like bones, for prosthetic joint design, e.g. The method may have further applicability as an aid in diagnosing certain types of genetic diseases, for example, those that are known to affect the proportions of the head.

In one embodiment, the invention may be a method of surface analysis comprising scanning one or more input surfaces that may represent body surfaces selected from a predetermined subpopulation that represent intended users of a product or apparatus and may be represented as a plurality of polygons to generate input data, storing input data, establishing a first reference point on each of the input surfaces, transforming the input data to orient the input surfaces relative to the first reference point, establishing an origin that may be located within each of the input surfaces, generating a plurality of rays extending from the origin that may extend in at least two dimensions and may be generally equally spaced, calculating intersections of the plurality of rays with the input surfaces, calculating distances from the origin to the intersections, calculating percentiles based on the intersections along each of the plurality of rays; and generating a surface using the percentiles. The method may further comprise establishing a second reference point on each of the input surfaces. In addition, the inventive method may comprise establishing a second origin, generating a second plurality of rays extending from the second origin, calculating second intersections of the second plurality of rays with the input surfaces, calculating distances from the second origin to the second intersections, calculating second percentiles based on the second intersections along each of the second plurality of rays; and refining the surface using the second percentiles. Each of the plurality of rays may intersect one of the plurality of polygons. Each generated surface may comprise a plurality of polygons formed by the intersections of a predetermined percentile. Moreover, the present invention may include a system for designing a product or apparatus using the inventive method to calculate dimensions of at least part of the apparatus.

In another embodiment, the inventive method may be used to design an apparatus requiring clearance or sealing and may comprise the steps of: transforming discrete data points from a plurality of sources to provide a common orientation, establishing a common origin for each of the plurality of sources, generating a mesh surface for each of the plurality of sources comprising a plurality of polygons which vertices comprise adjacent points within the discrete data points, extending a plurality of rays from the origin to a plurality of intersections with the plurality of polygons for each of the plurality of sources, calculating distances between each of the plurality of intersections and the common origin for each of the plurality of sources, comparing the distances for each of the plurality of rays and calculating threshold values, and designing the apparatus to have dimensions related to the threshold values. The mesh surface may comprise a curved line spaced from the origin and incrementally rotated about an axis passing through the origin. In addition, the method may further comprise sorting the plurality of intersections for each of the plurality of rays by distance from the mesh origin. Moreover, the calculating step may comprise computing percentiles for the distances and selecting at least one of the percentiles to be a threshold value.

In still another embodiment, the invention may comprise a system for designing an apparatus for use by a population of people. The system may further comprise: a device for scanning surfaces, a product fit plan, a coordinate transformation algorithm performed by a computer, an envelope processor for analyzing data sets and generating output surfaces, wherein the envelope processor may comprise an intersection calculation algorithm, and an output file. The system may further comprise a conversion module for converting files into a format usable by the envelope processor, a database of ray mesh files, and/or an algorithm for smoothing the output surfaces. In addition, the output file may be of a format readable by CAD software for displaying the output file graphically on a computer monitor or other display.

DETAILED DESCRIPTION OF THE INVENTION

The method and system of the present invention have a wide range of applicability, notably in making the application of 3D anthropometry more practical and effective for certain types of fit problems. In particular, they may address the use of anthropometry in the design of products intended to fit the human form. More specifically, the invention may be particularly well suited to address the issue of product design where fit involving clearance or sealing is involved. Contrary to several prior uses of anthropometry for product fit, the invention may be used to design products for a broad range of individuals, instead of customizing a product to a particular individual.

The present invention may have applicability to fields other than product design for people, such as any field where a common product may be intended for use with a population or subpopulation of recipients. For purposes of explanation, however, the method and system may be described herein with respect to designing a product such as a respirator mask that accommodates each member of a group of people.

According to one embodiment of the present invention, method 10 may require creating an initial fit plan 20 to assist in data transformation and ultimate product design. The fit plan may rely on making assumptions about the product to be designed in order to achieve greater efficiency when analyzing the images of the data sets. For example, a user may assume that a respirator mask should be generally symmetrical about the same plane that a head is generally symmetrical. When orienting the scanned images, it may therefore be desirable to generally orient the images relative to this same plane.

Once an initial fit plan has been chosen, a series of preparatory steps may occur to collect and organize sample data into forms and/or formats that may facilitate manipulation of the data.

Initially, data sets representing measurements taken from one or more samples are selected 30. Samples may be taken from a broad population of individuals. Preferably, samples may be collected from a subpopulation representative of eventual end-users. In one embodiment, the method and system may involve taking measurements to generate the samples. However, samples may come from a preexisting collection, such as those collected from the CAESAR project. In one embodiment, the samples were created by scanning individuals using a CYBERWARE scanner.

In addition to determining a fit plan 20 and selecting 30 the scans a user may wish to employ, preliminary steps may also include determining a sizing plan 40. The inventive method and system may not give a direct answer about the percentage of individuals accommodated by a design, unless designing is intended for about 100% of individuals. However, it may be possible to select a predetermined shell percentage to design to with a reasonable idea of the approximate percentage of the intended population or subpopulation that may be accommodated. Moreover, the method and system may make it possible to divide the population into groups based on a few standard measures and then design to accommodate a larger percentage of that smaller group. For example, it may be possible to create small, medium and large versions of the product for a better overall population fit. Because of this, however, it may be important to size the scans 50 to know which ones may be relevant to the preliminary sizing plan 40.

In one embodiment of the invention, the envelopes may only be valid for one product-positioning scheme. For example, the envelopes generated for a respirator mask, which may need to seal on just the face area, may be very different from the envelopes generated for a helmet that envelopes a larger portion of the head and may require clearance between the head and helmet for comfort.

However, even if this occurs, other envelopes may easily be created for designing other products or for alternatively positioning the original product. According to the method and system of the present invention, a product designed with a 98th percentile envelope may contain about 98% of the individuals sampled, and, depending on the size of the sample, about 98% of the population, at any single point on its surface. A smaller, but unknown, percentage of the samples would lie entirely inside the envelope. In this manner, the present invention may give an accurate idea of the mean surface shape and the range of variation relative to the product itself. Since envelope surfaces may be generated and evaluated at multiple locations on the samples, the resulting 98th percentile envelope may not be the same as a typically proportioned head of 98th percentile size. Similarly, a 50th percentile head envelope may not look like any "average" person any of us has ever met.

Once the scans have been selected 30, a set of data files, each representing a scan of an individual in the sample, may undergo a coordinate transformation, so that each is consistent with its expected position relative to the product to be designed. After this, an algorithm may be employed, resulting in a series of new surfaces that represent various percentile envelopes being created. These envelope surfaces may be somewhat like the layers of an onion. Any size population sample may be distilled down to just a few envelope surfaces, and it may be possible to only have one file associated with one sample open at one time while designing, thereby conserving system resources. In addition, data sets representing individual scans may be saved according to a predetermined file format, which may or may not allow for easy manipulation and processing of their data. As such, the scan data may be converted into a more efficient, easier-to-use, or otherwise more desirable file format for further manipulation or analysis.

In one embodiment, the data resulting from the scans may be in the form of a polygonal mesh, preferably a mesh of quadrilateral surfaces although mesh surfaces with fewer or more sides may be employed, as may a mesh having surfaces with various numbers of sides. This may be due to the digital nature of the scans, in which information is collected as a sequence of discrete data points. After the data has been collected or otherwise acquired, it may be repositioned 45 into a selected starting orientation. In the case of generally bilaterally symmetrical features, such as human heads, an approximate plane of symmetry such as the sagittal plane may be located and the data transformed to indicate the position of data points relative to the plane of symmetry. This initial alignment may aid in a later landmarking process 60, and, thereby, result in more accurate positioning.

Subject scans may be landmarked 60 according to the fit plan 20. This may be a manual process, but some secondary landmarks 112 may be located automatically. In addition, or alternative, to repositioning the data relative to an approximate plane of symmetry, consistent with a determined fit plan 20, the raw scanned data may be digitally marked with at least one key anatomical landmark 110 for alignment purposes. The landmarks 110 may further be used to reposition 62 the data, which may occur automatically without a prompt from the designer. Landmarks 110 may be dependent on the type of product being designed. Preferably, landmarks 110 are chosen to allow a close approximation of the product's fit, which may be accomplished by selecting landmarks 110 on positions near or overlaying the product to be designed when in use. Depending on the fit plan determined 20 and the product being designed, landmarks 110 may be selected so as to not be on the surface of the scanned images. In the case of designing a helmet, for example, the landmarks 110 may be chosen so they are slightly spaced away from a user's head because a tight seal may not be necessary. An existing landmark 110 from previous applications may work in a later application, or a user may choose to select 60 new landmarks 110. While the choice of landmark 110 locations may lead to more accurate results or increased processor efficiency, a user may select 60 any point to be a landmark 110 as long as the choice is systematic throughout multiple data sets.

One landmark 110 may be sufficient for the method, but preferably at least two landmarks 110, 112 are used. Other landmarks 112 may be positioned so that their range of positions is shown with feature envelopes. Secondary landmarks 112 may be located a set distance from the primary landmark 110, and the proposed size of the product and its fit plan may define this distance. For example, when designing a respirator mask that covers the nose and mouth, a first landmark 110 may be selected at or near the bridge of the nose and a second landmark 112 may be selected at or near a point between the lower lip and the chin. In one embodiment, selection 60 of the first landmark 110 may be a manual process while selection 64 of the second landmark 112 may be automated. However, both selection processes 60, 64 may be automated for speed and efficiency, or both may be manual if desired by the user. After landmarking 60, 64, the data set is ready to use for any number of contour studies.

Although multiple locations may be chosen as landmarks 110, careful selection of the landmarks may be significant in defining a coordinate system 120 for the resulting contour envelopes 130. In some applications, preferably, the product itself, or the fit plan that was determined 20 for the product, may define what the coordinate system 120 should be. Different types of products may require different coordinate systems 120, depending on how they fit to the body. In addition, the shape of the envelopes 170 may change depending on the choice of coordinate systems 120.

Although multiple orientations of the data sets may be possible, simplification of the process of the current invention may occur through planning the alignments of the data sets. Transforming 70 the data sets of the selected 30 scans may be accomplished in several steps. To set up the alignment, a common origin 122 for a coordinate system 120 is selected 72. In one embodiment, this origin may be a landmark 110, 112, which may further be a key point of contact that can be located accurately on each of the data sets. Preferably, the origin 122 may be located coincident with the ray mesh origin 142 (discussed below).

Figure 4:
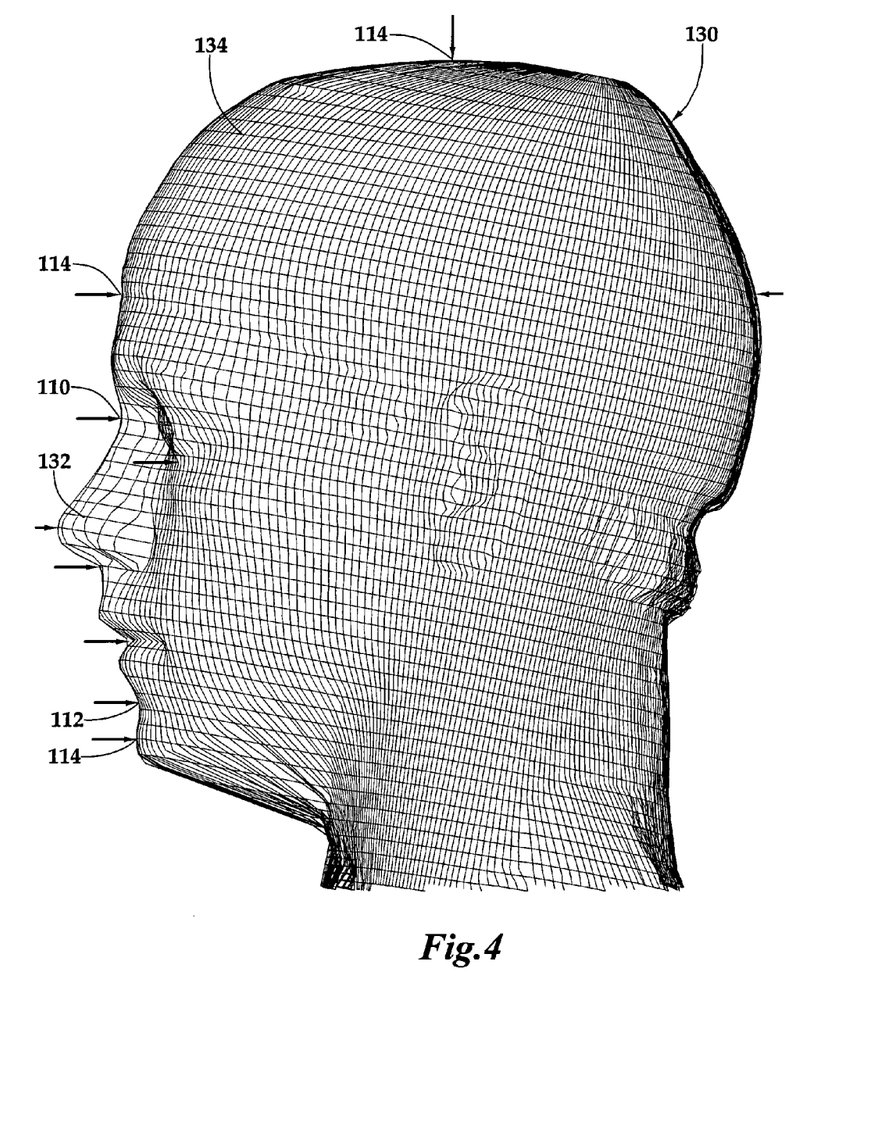
FIG. 4 is a sample of a head scan displaying multiple potential landmarks.

Another landmark 110, 112 may be chosen to define a common horizontal or vertical plane 124, and so on until the data set is fully constrained. Constraining 74 may involve selection 76 of additional landmarks 114 (FIG. 4 illustrates several potential additional landmarks 114), or, as discussed above, alignment 78 of the data sets relative to a natural axis or plane of general symmetry 124 in addition to the use of landmarks 110, 112. Before processing, the subject scans may be converted 79 to a format compatible with rapid processing of the envelope surfaces (discussed below). In one embodiment, this may assume that initial steps were done in a CAD environment with conflicting requirements.

Once the data has been constrained 74, the present invention may use the landmarks to calculate 71 a transformation matrix for each data set. This matrix may be used to transform the data from the set's coordinate system that was established during scanning into a common product coordinate system 120 for use during processing 80. In addition, subject scans may be moved and/or rotated based on landmarks 110, 112 and the fit plan. As discussed above, in one embodiment, the primary landmark coordinate 110 may become the new coordinate origin (0, 0, 0) 142. Aligning the scans to this landmark 142 may require only a translational transformation 73. Further, the secondary landmark 112 may define a horizontal or vertical axis such that a rotational transformation 75 may be performed to further align the scans to the secondary landmark 112. While these transformations 73, 75 may occur separately in one embodiment, in another, the translation 73 and rotation 75 may be calculated for each point before progressing to the next point. After transformation 70, both primary 110 and secondary 112 landmarks may be at generally identical coordinates for all subjects. Scan data, which may have been obtained in one format, may need to be converted 79 to a file compatible with the envelope processor 80 (discussed below). This conversion 79, if needed, may occur before or after transformation 70 of the data.

Figure 2:
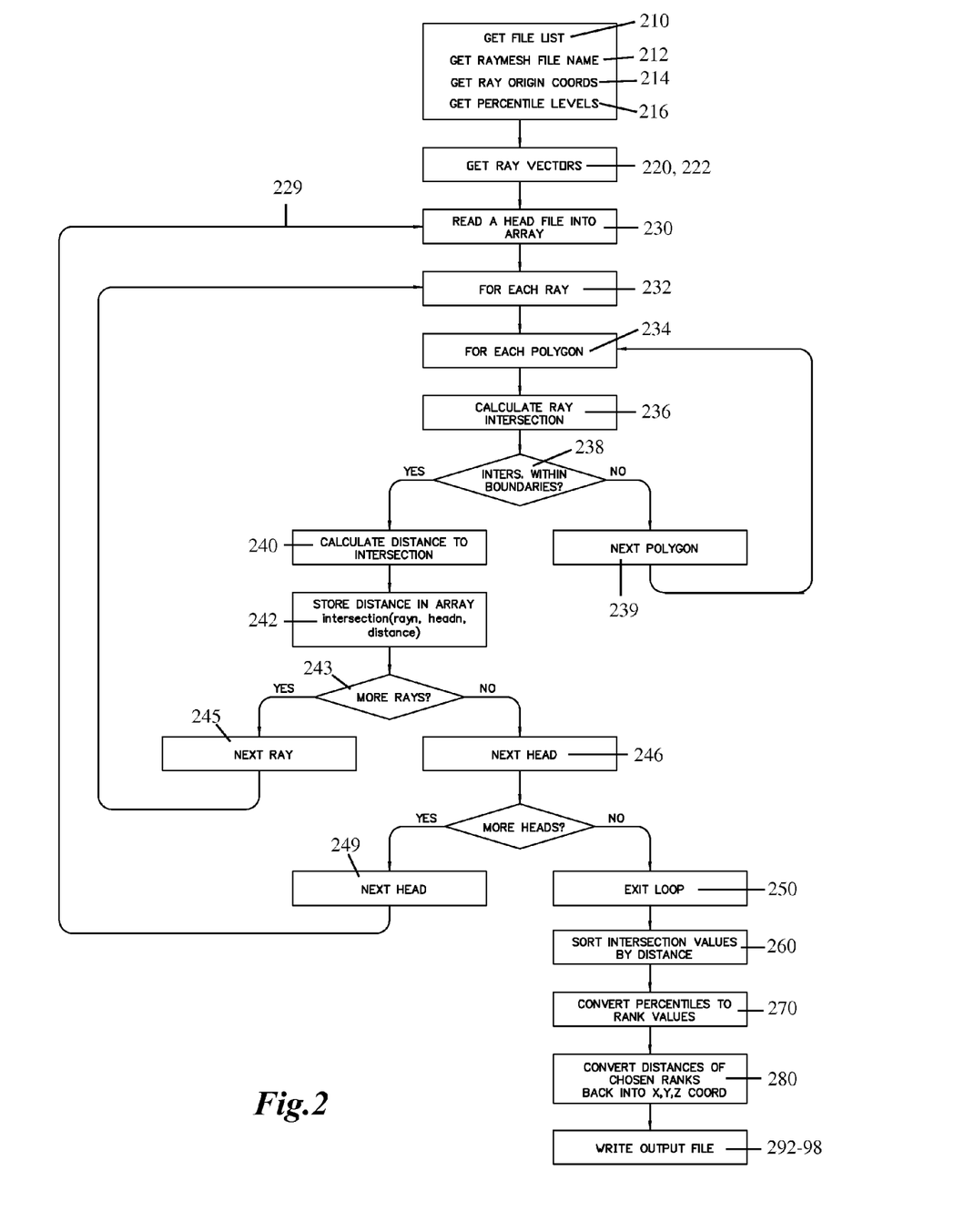
FIG. 2 is a flow chart of one embodiment of the inventive method and system.

Once the data sets have been saved and transformed 70, the method and system of the present invention may rely on envelope processing 80 to analyze the data sets and generate 82 the desired output surfaces 170. As shown in the flow chart of FIG. 2, and as described in greater detail below, the processor 160 may rely on a systematic algorithm 200 to process and calculate the required data. In one embodiment, this algorithm may generally be of the form:

```
Get list of scan files to process 210
Get name of the ray mesh file 212
Get origin coordinates 214
Get Percentile values to map (ie: 10%, 20%, 50%, 80%, 90%) 216 (this
may be a user selection)
Read ray mesh file 220 and store vectors in an array 222
For each Head 229
   Read head file and store in simple array of X, Y, and Z coordinates
230
   For each ray 232
      For each polygon in head 234
         Locate intersection of ray and plane of the polygon 236
         Check intersection 238; is it within boundaries of polygon?
         If yes:
            Calculate intersection distance from ray origin 240
            Store distance in array intersection(rayn, headn,
distance) 242
            Done with this ray 243, go to Next Ray 245
         If no:
            go to Next Polygon 239
         Next Polygon 239, repeat locating 236 and checking 238 steps
      Next Ray 245; Next Head 246 if no more rays
Next Head 246, 249; Exit loop 250 if no more heads
Sort Intersection arrays 260 by distance
Convert desired output percentiles to rank numbers 270
For each ray
   For each output percentile
      Convert distance along ray back into X,Y,Z coordinates 280
   Next output percentile
Next ray
Open output file 292
Write file header 294
For each ray mesh polygon
   For each percentile level
      Write polygon data to file 296
   Next percentile level
Next ray mesh polygon
Write file tail 298
```

Once the data sets have been selected/saved 30 and transformed 70, a user may then select 212 or create 213 a polygonal mesh 140 to drive the arrangement and spacing of vertices 172 in the contour envelopes 170. This polygonal mesh 140, which may be used to define the directions of a plurality of rays 144, may be referred to as a ray mesh 140. The simplest ray mesh 140 may be a spherical mesh centered on the origin 142, but this may often result in rays 144 that fail to intersect any scans 130 (such as through the open neck of head-only scans), or intersect in areas that are not of interest. In addition, if a spherical ray mesh 140 has "poles" 148 where edges converge at a point, like lines of longitude, then the envelope mesh 140 may be comprised of variably-sized polygons 146, which may cause rays 144 emanating from mesh origin 142 to not be evenly spaced, for example, by causing "bunching" of rays near a pole 148. This may be useful in some applications, however, such that, if more detail is required in one area, the pole 148 may be oriented to point toward that area, directing more rays 144 in that direction.

Ray mesh 140 preferably extends in three-dimensional space about mesh origin 142. However, mesh 140 may not completely surround mesh origin 142 depending on the product to be designed. For example, for designing products to be used on or around the head, it may not be necessary to extend the mesh 140 to a point between mesh origin 142 and the neck, especially since a body scan may not reveal any surfaces internal to the neck. A more useful ray mesh 140 for faces may be a portion of a sphere generated by sweeping an arc about an axis, for example, a vertical axis. The polygons 146 may not, therefore, be of equal size at all points on the sphere-portion. While polygons 174 on the resulting envelopes 170 will still vary in size, because of varying distances from the origin 142, the variations may not be as great as in the case of a completely spherical mesh 140 because there may be no poles around which bunching may occur. Selection of a mesh 140 in this way may avoid performing calculations for rays 144 that may never intersect any scanned surface or any surface that is generally not of interest, which may save computational time.

Figure 6:
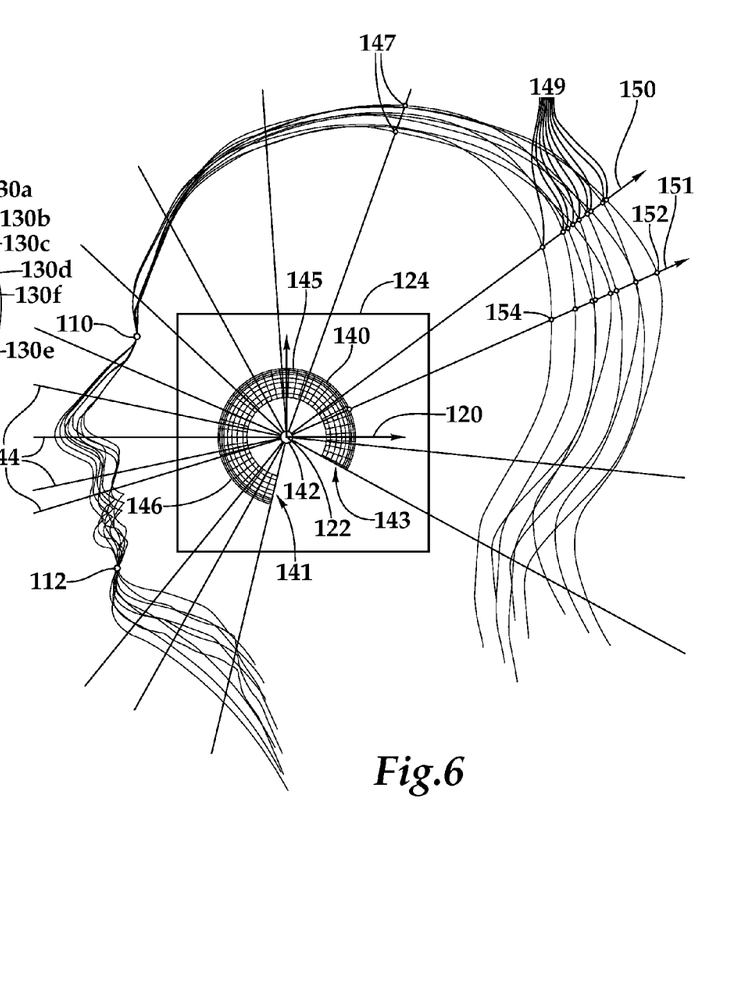
FIG. 6 is a sample of the head scan slices of FIG. 5 with one embodiment of a ray mesh inside the scan images and rays emanating from the mesh origin.

Processing speed, therefore, may be much better when the ray mesh 140 is designed similar to the mesh 140 shown in FIG. 6, which is truncated to avoid or minimize rays 144 that miss the scanned surfaces 130. In one embodiment, envelope processor 160 may be configured such that rays 144 that miss all polygons 134 take longer to process than those that actually intersect because the processor 160 may continue to look for an intersection 147 until all polygons 134 in a head have been checked. On average, each ray 144 may need to only have to check about half of the polygons 134 in each scan to find an intersection 147. It may be evident that rays 144 passing through a large hole in the data set, such as the neck of a head scan, add drastically to the processing time.

Ray mesh 140 may be a polygonal mesh that emanates from mesh origin 142. In another embodiment, the polygonal mesh 140 may be spaced from the origin 142 and may surround at least a portion of the space around origin 142, such as a portion of a sphere. In yet another embodiment, the ray mesh 140 may be a flat plane or any other surface that may be convenient for analysis of a scanned surface. The user may create a new ray mesh 140 for each application. Preferably, however, various different predetermined ray mesh configurations 140 may be saved as separate files, allowing the user to select the desired ray mesh file to define the ray vector pattern.

If ray meshes 140 are predetermined or stored for repeated use, ray mesh files may have a format that improves processing time. In one embodiment, ray mesh files may have names ending in the suffix ".DME". The .DME, or similar, files may describe a polygon mesh 140 with a minimum of redundancy by storing each vertex 145 location only once in a numbered list of coordinates. A separate file section may list all the polygons 146 as a table of a plurality of vertex 145 numbers. Preferably, polygons 146 are quadrilaterals so table will have four vertex 145 numbers. Most of the vertices 145 may be common to four separate polygons 146. By using this structure and storing the vertices 145 only once, the calculations may be reduced to nearly ¼ of what may be required otherwise. If DME files are used, the ray mesh 140 files may be formatted as shown below, however other file formats are usable:

```
Vertex_total
Nvertex X Y Z
Nvertex X Y Z
Nvertex X Y Z
Nvertex X Y Z
Polygon_Total
Npolygon Vert# Vert# Vert# Vert#
Npolygon Vert# Vert# Vert# Vert#
Npolygon Vert# Vert# Vert# Vert#
Npolygon Vert# Vert# Vert# Vert#
```

The following may be a sample of a ray mesh 140 file with some data cropped out:

| 221 | | | |
|---|---|---|---|
| 1 | 0.882008 | 0 | 0.471443 |
| 2 | 0.92397 | 0 | 0.382721 |
| 3 | 0.906216 | 0.180258 | 0.382721 |
| 4 | 0.86506 | 0.172071 | 0.471443 |
| 5 | 0.957034 | 0 | 0.290313 |
| 6 | 0.938645 | 0.186708 | 0.290313 |
| . | | | |
| . | | | |
| . | | | |
| 217 | −0.957034 | 0 | −0.290313 |
| 218 | −0.92397 | 0 | −0.382721 |
| 219 | −0.882008 | 0 | −0.471443 |
| 220 | −0.831551 | 0 | −0.555625 |
| 221 | −0.773086 | 0 | −0.634456 |

| 191 | | | | |
|---|---|---|---|---|
| 1 | 2 | 5 | 6 | 3 |
| 2 | 5 | 7 | 8 | 6 |
| 3 | 7 | 9 | 10 | 8 |
| 4 | 9 | 11 | 12 | 10 |
| 5 | 11 | 13 | 14 | 12 |
| 6 | 13 | 15 | 16 | 14 |
| 7 | 15 | 17 | 18 | 16 |
| . | | | | |
| . | | | | |
| . | | | | |
| 182 | 198 | 199 | 212 | 211 |
| 183 | 199 | 200 | 213 | 212 |
| 184 | 200 | 201 | 214 | 213 |
| 185 | 201 | 202 | 215 | 214 |
| 186 | 202 | 203 | 216 | 215 |
| 187 | 203 | 204 | 217 | 216 |
| 188 | 204 | 205 | 218 | 217 |
| 189 | 205 | 206 | 219 | 218 |
| 190 | 206 | 207 | 220 | 219 |
| 191 | 207 | 208 | 221 | 220 |

This structure may clearly define the relationship of rays 144 to output polygons 146, and may create an efficient process to take the intersection 147 data along each ray 144 and use it to create a corresponding envelope mesh 170.

Moreover, the present method and system may include a conversion module in the processing program to convert any 3D mesh 140 into a .DME, or similar, file. Any arbitrary polygon mesh with 4-point polygons may be used. However, meshes with polygons having fewer or more points are also within the scope of the conversion module.

Selection of the extent of the mesh 140 may occur visually by selecting a location for the mesh origin 142 on a display of a sample surface or image and then selecting the location of the mesh beginning 141 and termination 143. In another variation, mesh extent may be selected by inputting the angle ranges of analysis relative to the mesh origin 142 and a predetermined coordinate system. Preferably, mesh origin 142 is selected so that it is internal to the outer surfaces 130 scanned, such as "inside" the head in the case of a head scan.

The ray mesh 140 may be a polygonal mesh that defines the ray vectors. Each ray 144 may be a line passing through the ray origin (0, 0, 0) 142 and through a ray mesh vertex 145. Every polygon 146 in the ray mesh 140 may correspond with a polygon 174 in the resulting envelopes 170.

As discussed below in greater detail, the method may involve projecting imaginary rays 144 outward through the surfaces 130 of the scanned images from one or more origin points 142. The rays 144 may emanate at any point that is interior to all the scanned surfaces. The shape of the ray mesh 140 may control what portions of the scans may be probed for ray intersections 147, such that the entire surface 130 of each scan may not need to be evaluated. For example, in the case of a respirator or ventilator mask, a mesh 140 may be designed to cover the entire face and scalp of the subjects, but ignore the neck and ears. Moreover, the fineness of the ray mesh 140 may determine the fineness of the resulting envelope surfaces 170.

In order to improve efficiency, preferably each ray 144 only intersects a surface 130 once, which may be more difficult when dealing with convoluted shapes like the pinna of the ear. However, several origins 142 may be used to meet this limitation by creating a plurality of surfaces 170 and then combining the results of the surfaces 170 into a more complete representation. When one mesh origin 142 is used, origin 142 will preferably be approximately equidistant from the areas of interest. However, origin 142 may also be located closer to one surface than another if the closer surface is determined to be of greater interest. In this way, the rays 144 extending from the mesh origin 142 may not disperse as widely before contacting the closer surface than they may when contacting the farther surface. Otherwise, the location of the origin 142 may have no effect on the resulting envelope surfaces 170.

Once the calculation of the intersections 147 of the rays 144 with the surfaces 130 has been accomplished, the intersections 147 for each ray 144 may then be sorted by distance and converted to percentiles. Points corresponding to similar or the same percentiles may be joined to form polygons 174 to define the envelopes 170.

The ray mesh 140 may further comprise a plurality of rays 144 extending in three dimensions from the mesh origin 142. The ray mesh 140 may essentially define a vector for the each of the plurality of rays 144. In one embodiment, rays 144 may pass through the vertices 145 of the ray mesh 140 such that the location of each vertex 145 relative to the mesh origin 142 may define the direction of each ray 144. In another embodiment, vertices 145 of mesh elements 146 may be used to calculate a center or other internal location for each element 146, with rays 144 passing through these centers or calculated locations. In addition to defining vectors, the ray mesh 140 may also provide a convenient way to associate the polygons 146 of the ray mesh 140 with the polygons 174 of percentile surfaces 170 (discussed below).

A finer mesh 140 may result in greater accuracy of a final designed surface. However, a finer mesh 140, with vertices 145 spaced more closely together may also require more processing time to perform the calculations required for each ray 144 since more rays 144 will be used. Conversely, a user may be able to select a more coarse mesh 140 if greater detail is not required, for example, for testing the general properties of the method and system.

The method and system of the present invention may employ one ray mesh 140 to analyze the surface 130 in each data set. In another embodiment, multiple ray meshes 140, 180 may be used. Additional meshes 180 may provide greater detail in areas of particular concern. For example, with respect to a head scan, placing a second mesh origin 182 nearer the lips of a scanned image than the first mesh origin 142 may result in a finer mesh 180 having more rays 184 intersect the data scans in that area. Additional ray meshes 180 may also be beneficial in locations where a ray 144 may cross a scan more than once, such as with the folds of an ear. In situations like this, additional mesh origins 182 may be located between the multiple layers, which may account for more accurate results with respect to both the inner and outer surfaces.

Once the ray mesh 140 or meshes have been established, the present invention may proceed to calculate intersections 147 of the rays 144 with the surfaces 130 of each data set. In one embodiment, the intersection calculation loop may proceed in the following manner, or it may proceed in any other manner that calculates the intersection 147 of each ray 144 with the scanned surface 130 for each scan:

```
For each head
    For each ray
        For each polygon in head
            Locate polygon-ray intersection
            Test intersection...is it within polygon boundaries?
            If yes:
                Calculate distance from origin
                Store in array as distance
                Goto next ray
        Next polygon
    Next ray
Next head
```

As discussed above, each surface 130 may be represented as a plurality of polygonal surfaces 134. If a ray 144 intersects a vertex 132 of each surface directly, these two points may be used to calculate the distance and/or direction between the ray mesh origin 142 and the intersection 147. However, it may be likely that a ray 144 will intersect a surface somewhere inside a polygon 134 of the surface 130. In this case, the present invention may calculate the point of intersection 147 on the surface 130 or it may determine which vertex 132 is closest to the point of intersection 147 and then calculate and store the distance between the ray mesh origin 142 and that point 147 or vertex 132. The intersection locations 147 may be stored as distances from the origin 142, which may require less memory than storing them as (X,Y,Z) coordinates, and also may facilitate a later step of sorting intersections 147 for each ray 144. Distances may also be used since their values can easily be stored in the rows of an array along with identifiers for the respective data scan files and ray 144 numbers. However, points of intersection 147 may be stored as Cartesian coordinates, cylindrical coordinates, or any other method contemplated in the art. Once the point of intersection 147 has been found and its distance from the ray mesh origin 142 calculated, the method may proceed to perform a similar calculation for the next ray 144 of the mesh 140, and so on, until all ray-surface intersections 147 have been determined.

In one embodiment, each polygon 134 of the scanned surface 130 may be searched for a given ray 144 until a surface 134 containing the intersection 147 is found. However, other methods for determining the point of intersection 147 are within the scope of this invention. In addition, for a given file, every ray 144 of the ray mesh 140 may be searched before closing that file and opening a new one, which may increase processing efficiency and decrease computation time. However, it may be possible to calculate the distance between the ray mesh origin 142 and the polygons 134 of every scanned surface 130 before continuing to another ray 144.

Once all of the intersections 147 of the rays 144 with the scanned surface 130 of a given scan have been determined, the method may close the data set associated with that scan, open a data set associated with an additional scan, and repeat the intersection process, etc, until all intersections 147 for each ray 144 and for each data set or scanned surface 130 have been determined.

Next, the software may analyze the calculated data and perform a core task of generating percentile envelopes 170. Envelope surfaces 170 may be created by intersecting rays 144 emanating from a common origin 142 with the polygons 134 of the head scan data. The ray pattern may correspond with the spacing of the polygonal mesh 174 of the resulting envelopes 170. For each ray 144 analyzed, all intersections 147 with the data set of scans are found, which are a series of points 149 along the ray 144. According to the present invention, these intersection locations 147 may be temporarily stored as distances along the ray 144. These distances may then be sorted by distance from the mesh origin 142 so that percentile values may be determined. After all heads have been tested for intersections 147 with the rays 144, and the intersection lists have been sorted, the actual envelopes 170 may be created. As discussed above, this procedure may be exemplified in the flow chart of FIG. 2.

According to the intersection calculations described above, the outermost intersection 152 may become a point on the 100th percentile envelope 175, the innermost intersection 154 may become a point on the 0th percentile envelope 176 and the median distance 156 may be a point on the 50th percentile envelope 177. These percentile rankings are not a measure of size, but a measure of what portion of the population may be inside of the envelope 170 at that specific location. The rankings may only apply for the alignment or fit plan that was used to create them or they may have applicability beyond that alignment or fit plan. The percentile envelopes 170 may then be used to design product surfaces that either avoid contacting the skin (clearance), or ensure contact while minimizing deflection of tissue and product (sealing).

Different origin locations 142 may result in equivalent envelopes 170. Origin 142 location may affect the quality of the envelope mesh 170 but not the "ideal" infinite resolution surface, nor may it significantly affect the quality of fine-mesh surfaces. In other words, a given polygon 134 on a given scan 130 may be assigned to the same percentile, regardless of origin 142 location (assuming a valid origin location). This may be true for the 100th and 0th percentile surfaces 175, 176 and for each percentile surface in between, such that envelope surfaces 170 may not be influenced by ray origin location 142.

As stated above, for a given ray 144, the distances from the mesh origin 142 to the scanned surfaces 130 may be compared. Each of the selected output percentiles may be converted to a rank number. In one embodiment, ranking may be a simple statistical exercise, for example, employing the formula: Rank=Percentile*Heads/100. In this case, for example:

50%*600 heads/100=rank 300

10%*600 heads/100=rank 60

90%*600 heads/100=rank 540

Conversely, if the number of samples is known, the affiliated percentile may be calculated for a desired ranking. The smallest distance may be assigned the $0^{th}$ percentile, the largest distance may be assigned the $100^{th}$ percentile and the distances in between may be assigned relative percentiles depending on their values. In one embodiment, available percentile demarcations may be dependent on sample size. For example, for n samples, the $x^{th}$ distance may be assigned the $100*x/n^{th}$ percentile, e.g. the $10^{th}$ distance of a 50 scan sample may be assigned the $20^{th}$ percentile.

In another embodiment, traditional statistical analysis may be performed wherein mean and standard deviation values are calculated and percentiles are calculated based on these values. This may work best with large sample sizes that may result in a generally normal distribution of values. In addition, the inventive method and system may allow for interpolation between sample points 149 to generate percentiles. It may take a significant amount of time to process a large data set. However, once the envelopes 170 have been created, the resulting database may be considerably smaller than the databases for the scans, even for an extremely large sample. It may further be advantageous to calculate envelopes 170 at more percentiles than originally sought since, once calculated, retrieval may be as easy as looking up the stored values in a table and plotting them instead of having to calculate values anew for each scan sample and performing new calculations.

Once intersection 147 distances corresponding to key and/or predetermined percentile values are found for each ray vector 144, they may be converted back to three-dimensional coordinates using the vectors associated with the ray mesh vertices 145. This may occur on a ray-by-ray, percentile-by-percentile or other basis. Moreover, these coordinates may be converted to Cartesian, cylindrical or any other coordinate system. For each group of rays 144 that correspond to a polygon 146, 172 of the ray mesh 140 or of the percentile envelope 170, the coordinate locations may be written to a file as a polygon 146, 172 in the desired output format, such as .DXF. The final output file may be comprised of polygons 146, 172 representing contour envelopes 170 for each of the selected percentiles. With their points in a readable format, the envelopes 170 may be imported into CAD software and used to design product surfaces optimized to fit the population represented by the envelopes 170 or otherwise plotted to give a graphical representation of the surface or surfaces they represent.

By connecting all of the values of a selected percentile, the present invention may generate a percentile envelope 170 or a series of shells representing various percentile envelopes. Once this percentile envelope 170 has been generated, it may be used to dimension the surface of a product. In some cases the actual envelope surfaces 170, and surfaces derived from them, may be used as product surfaces.

This method may have particular applicability in the area of clearance. In this case, a designer may select the $100^{th}$ percentile and then make the dimensions of the product slightly larger than this percentile envelope 175. Since the $100^{th}$ percentile represents the largest distance away from the mesh origin at each ray, a surface 175 designed with this percentile should be as large as or larger than every user at each point. However, a designer may not be limited to using the $100^{th}$ percentile. Based upon a selected percentile threshold, a designer may simply use higher percentile surfaces, or surfaces offset outward from the selected percentile threshold surface, to maintain clearance. For example, a designer may decide that it is acceptable to design a product to clear the $80^{th}$ percentile, knowing that its fit may be problematic for users having dimensions that exceed this threshold. In this case, it may be possible to use, for example the $85^{th}$ percentile surface for clearance or to use the $80^{th}$ percentile and then enlarge the dimensions where desired to create an intended clearance.

Similarly, a designer interested in sealing may select the $0^{th}$ percentile and dimension the product to be slightly smaller than this percentile envelope 176 since the product should then be smaller than every user's dimensions at every point. Or, as in the clearance case described above, the designer may decide that it is acceptable to design a product to seal for at least the $20^{th}$ percentile, knowing that it may cause leaks for users having dimensions below this threshold. In this case, the designer may elect to use lower percentile surfaces, or surfaces offset inward from them, to maintain contact.

In the case of clearance, individuals falling closer to the higher percentile envelopes 170 will have less clearance and may experience a noticeably tighter fit than those falling closer to the lower percentiles. In the case of sealing, these same individuals may have more compression of tissue and product, which may lead them to be the least comfortable of users. When possible, multiple sizes may be used to minimize these effects. If a product designer is interested in making a product having multiple sizes, multiple percentile envelopes 170 may be generated. For example, for sealing, the $0^{th}$ percentile envelope 176 may correspond to a "small," the $35^{th}$ percentile envelope may correspond to a "medium," and the $70^{th}$ percentile envelope may correspond to a "large." By giving users more options and reducing the maximum variation a user may experience, sealing contact in areas where the difference between lower and higher percentiles is relatively small may result in less compression of user tissues or product. This may generally lead to lower contact pressures and more comfort.

If a designer intends to make a product with multiple sizes, and those sizes require different fit plans, the subject scans may be divided by size, with separate envelopes 170 then generated for each size. Sizing may be done based on a repeatable process, such as repeating the process for the entire sample of scans but replacing the full sample with the different subsets, and the process may be chosen so that the resulting envelopes 170 have manageable differences between low and high percentile surfaces. If multiple sizes are used, and the preliminary envelope results based on a preliminary sizing plan result in envelopes 170 with too large a difference between high and low percentile envelopes, then the sizing scheme and fit plan may be reconsidered, and new envelopes 170 generated. This iterative process may be repeated until acceptable results are achieved.

The shells may be output in the form of a polygonal mesh 174, preferably having triangular or quadrilateral elements. More advanced surface types may be used, but this may involve altering the results, for example, to achieve mesh element surfaces that interface properly with each other or to smooth the digitized lines into curves. Depending on desired processing time, tolerance requirements or other concerns, the mesh 140 may be coarse or fine. The finer mesh 140 may take longer to process since it involves more ray intersection 147 calculations. However, this may become less of a factor depending on the processor speeds and amount of memory that are allocated to implementing the inventive method.

The envelope generating processor may use a special format file (*.HDP . . . Head Data Processor). Files in this format may be simple comma delimited lists of polygons 174, such as:

---
x1, y1, z1, x2, y2, z2, x3, y3, z3, x4, y4, z4
x5, y5, z5, x6, y6, z6, x7, y7, z7, x8, y8, z8
x9, y9, z9, x10, y10, z10, x11, y11, z11, x12, y12, z12
x13, y13, z13, x14, y14, z14, x15, y15, z15, x16, y16, z16
. . .
---

The .HDP file format for 4 polygons shown above may include 16 distinct points for the polygons. However, points on one polygon may also lay on a second polygon. If, for example, the first polygons shared a common side, the .HDP file may look like:

---
x1, y1, z1, x2, y2, z2, x3, y3, z3, x4, y4, z4
x1, y1, z1, x2, y2, z2, x7, y7, z7, x8, y8, z8
. . .
---

Other file formats are possible and may be better or more efficient, but .HDP files may be read quickly and conserve memory. According to the present method and system, a user may extend the format to include anthropometric landmarks 110 also, so some of the alignment steps may be automated.

While increasing the resolution of the mesh 140 may noticeably increase processing time, creating a plurality of shells 170 for a given resolution may not significantly affect the processing time, within reason. A typical set of calculated shells 170 may be: 0%, 2.5%, 5%, 10%, 20%, 30%, 40%, 50%, 60%, 70%, 80%, 90%, 95%, 97.5% and 100%. However, the number of shells 170 and the percentiles represented by each shell 170 may be independently selected by a user depending on his needs, on a product's uses or on any other reason understood in the art.

Once the desired shell or shells 170 have been calculated, the method and system may allow the user to output one or more of those shells 170 to a display for viewing. All desired surfaces may be displayed, but, preferably, the user may be able to designate which percentile surfaces to output, for greater flexibility. For example, given the shells calculated above, a typical output selection may be the 2.5%, 20%, 50%, 80% and 97.5% shells 170. More or fewer levels may be output as desired.

In one embodiment, the various percentile shells 170 may be separated into different layers, so each can be viewed separately. In another embodiment, shells 170 may be viewed together, which may allow a user to compare similarities or differences at different locations on the shells 170, or examine how a product designed for one shell may interfere with or clear the surface of another shell and to what degree. The final output file may comprise polygon meshes 174 representing the contour envelopes 170 for each of the selected percentiles in which the meshes 174 may be placed on separate layers for each percentile. In another embodiment, separate output files may be created for each percentile calculated and/or displayed.

If datums, such as the landmark 110 or landmarks 112 and/or the mesh origin 142, are well chosen, the envelope surfaces 170 may unambiguously show what the range of contours is for a population, or a selected subpopulation, relative to one specific product type. The shells 170 may be easily opened by any computer aided design software. In addition, once a product prototype or finished product has been designed, the envelopes 170 may be juxtaposed with the product, accurately indicating how well the population or subpopulation may be accommodated.

Certain dimensions of the product may be more critical than others in the overall design. In this case, a designer may have more latitude to create a hypothetical surface in a non-crucial area and then intersect or merge it with the calculated percentile envelope in the significant area. Moreover, since the data is digitized, the percentile envelope 170 may be comprised of a series of short line segments. This effect may be minimized by selecting a mesh origin 142 near the surface, which may result in a more dense collection of rays 144 and intersection points 147 in that area. In areas where the mesh 140 may not be as dense, a designer may opt to use a flexible or padded surface to allow for the potential of larger variations while maintaining a more comfortable fit across a wide range of individuals. In addition, known techniques may be used to smooth these segments into continuous curves, which may result in better results, improved aesthetics, better product symmetry or other advantages.

In another embodiment, a product designer may already know what its maximum or minimum dimensions for a product may be. These dimensions may be used to create a hypothetical maximum or minimum product design that may then be compared with the selected percentile envelope 170. Points where the hypothetical design and the envelope 170 intersect may represent a sealing edge, pointing out the need for increased sealing capabilities in areas away from the edge. Points where the hypothetical design and the envelope 170 do not meet may represent a clearance edge, meaning that padding may be required in other areas for comfort to reduce the compressive forces in those areas.

Alternatively, the system and method may be used to generate percentile envelopes 170 to design molds or models. For example, a "normal" head model may be desired. In this case, the 50th percentile envelope 177 may be generated and a head having dimensions corresponding to that envelope 177 may be created. With this "normal" model available, designers may then rely on traditional methods of product design, such as hand-sculpting a clay sample of the product to fit the model.

With reference to the figures, the following example may illustrate the inventive method and system as applied to the analysis of data and design of multiple sizes of a hypothetical respirator mask.

Figure 3:
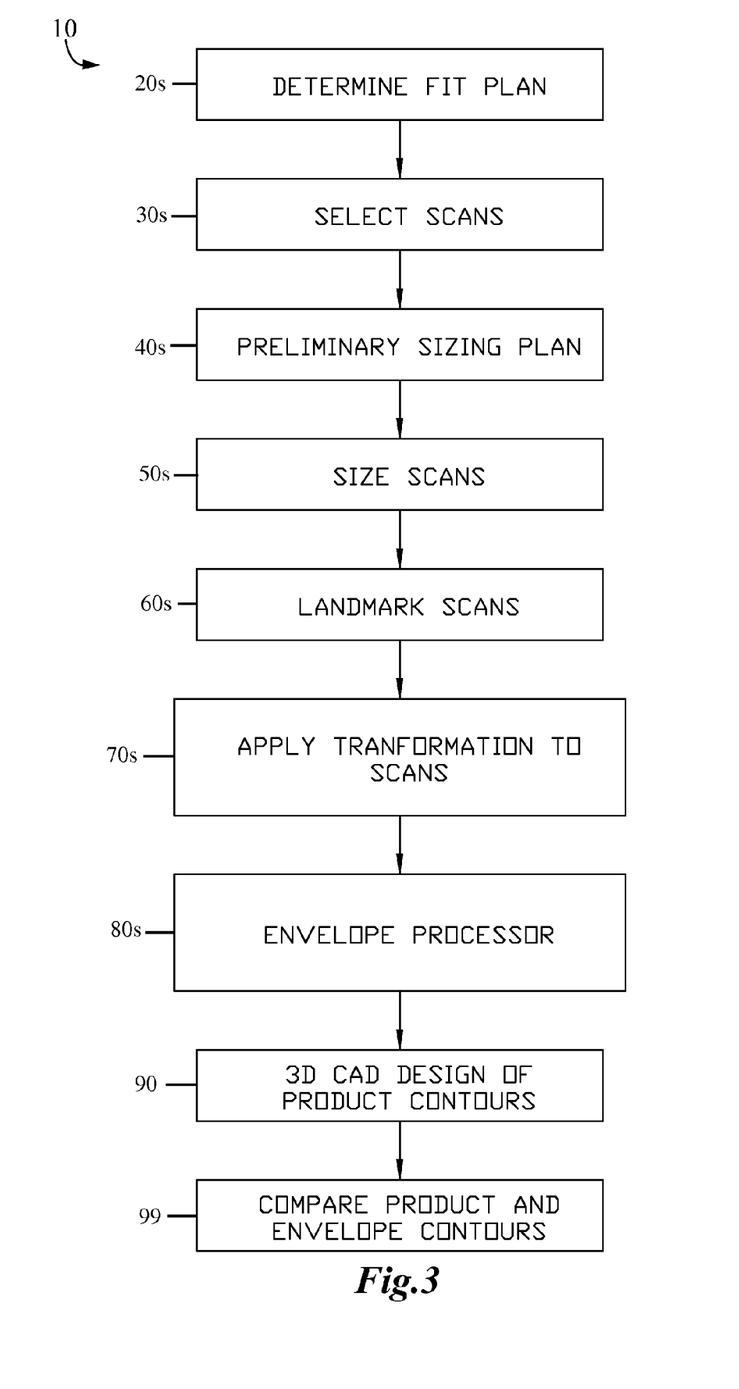
FIG. 3 is a flow chart of another embodiment of the inventive method and system.

The following steps, as described in part in the flow chart of FIG. 3, may apply to use this method to design a respirator mask:

Create 20 a fit plan for the mask and make 40 initial choices of mask heights. For example, determine if the product will be one-size-fits-all or if multiple sizes are desired.

Select 30 the scans that represent the user population. One such scan 130 may be seen in FIG. 3, along with several potential landmark locations.

Select the desired points of contact along the mid-sagittal plane. For example this might be a point on the bridge of the nose, such as point SE-0 in FIG. 4 (the menton) and a point about 4 inches away near the chin, such as point SL-0.

Assign 50 each individual scan to a mask size based on key measurements such as face height and width.

Place 60 landmarks 110, 112 on the scans to allow alignment consistent with the initial product fit plan. In this case, the points of contact, SE-0 and SL-0, may be both points of contact and landmarks 110, 112.

Figure 5:
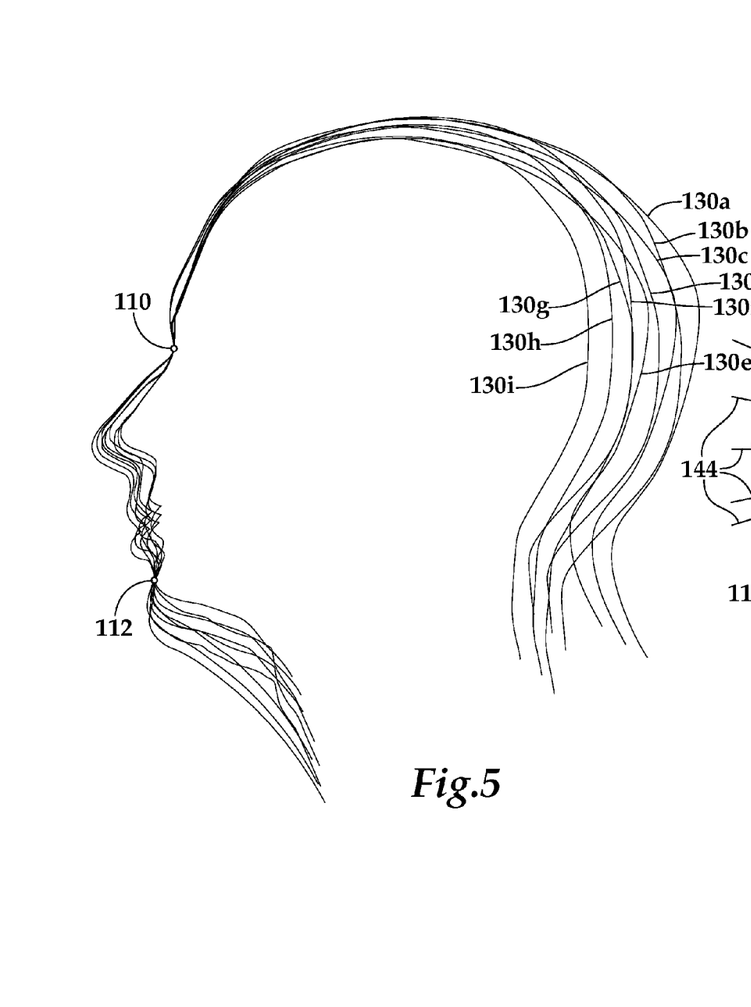
FIG. 5 is a sample of slices of several head scans oriented with common primary and secondary landmarks.
Figure 7:
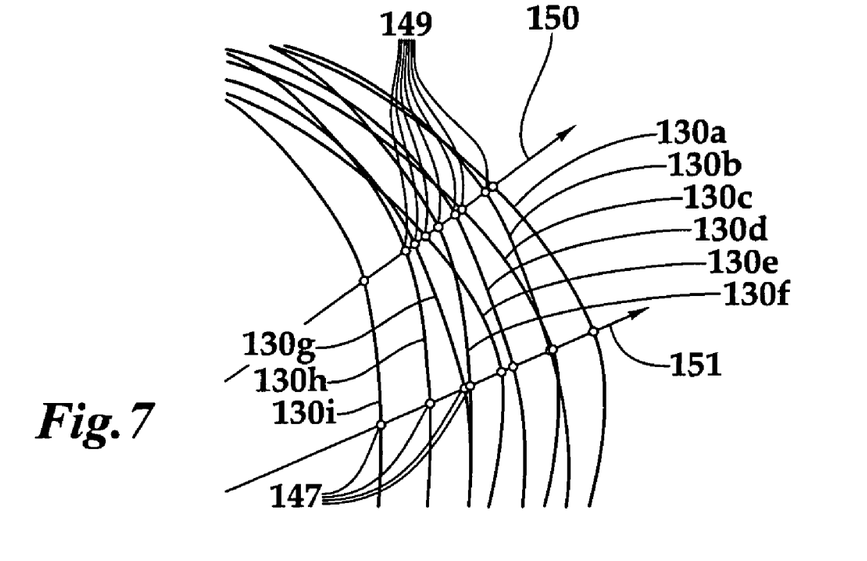
FIG. 7 is a close-up of the intersection of two rays with the several head scan slices shown in FIG. 6.

Align 70 the individual scans based on planes of symmetry and/or reference coordinate systems. This can be automated by performing a coordinate transformation on the data, knowing the locations and orientations of the landmarks 110, 112 and plane of symmetry, as well as the locations of the scan data points relative to the landmarks. Alternatively, it may be possible to translate 73 and rotate 75 the scan surfaces 130 manually and align them using a CAD program. FIG. 5 shows a two-dimensional cross-section of several scans 130A, 130B, 130C, etc., passing through the general plane of symmetry 124 (not shown). As can be seen in FIGS. 5-7, the facial variations from sample to sample mean that one scan may not represent the same percentile everywhere. For example, the sample having the largest chin does not necessarily also have the largest nose or brow.

Determine 80 percentiles to generate.

Determine 84 coverage area and desired envelope mesh quality. As shown in FIG. 6, the approximately 75 degree swath that passes from under the jaw, through the neck and to the back of the head may not be analyzed in this application because fit around the neck may not be necessary and because a scan may not be able to acquire accurate data in this area. Also as shown in FIG. 6, the mesh origin 142 is selected inside the head so that a ray 144 extending outwardly from the origin 142 may only pass through one surface 134 of the head. The mesh 140 in this example is a curved surface surrounding and spaced from the mesh origin 142 that may be created by incrementally rotating a curved line that is concave relative to a line passing through the mesh origin 142 about that line. The degree of incrementation and/or the distance from the mesh origin 142 may determine how fine or rough the mesh 140 is. In other applications, the curved line may be extended to form a semicircle such that its rotation about the line passing through the mesh origin 142 may form a sphere or portion of a sphere.

Figure 1:
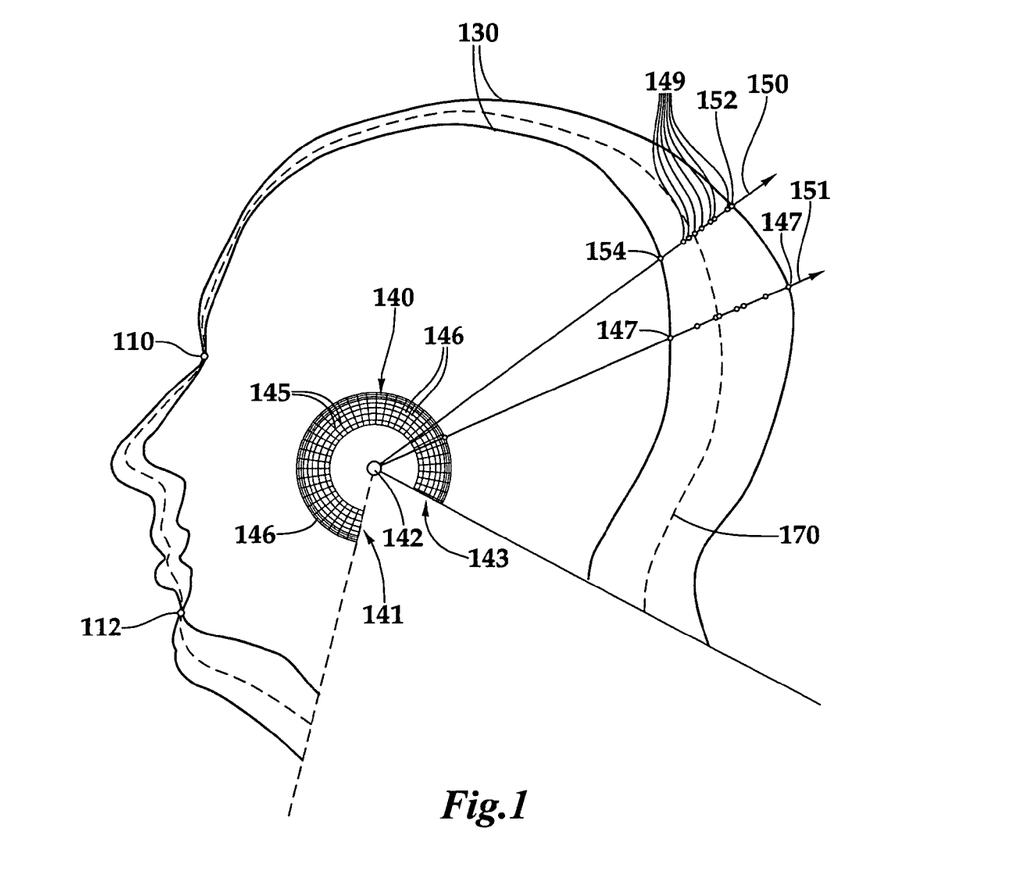
FIG. 1 is an example of a percentile envelope of the invention generated over generally the same angular extent as an inventive ray mesh.
Figure 8:
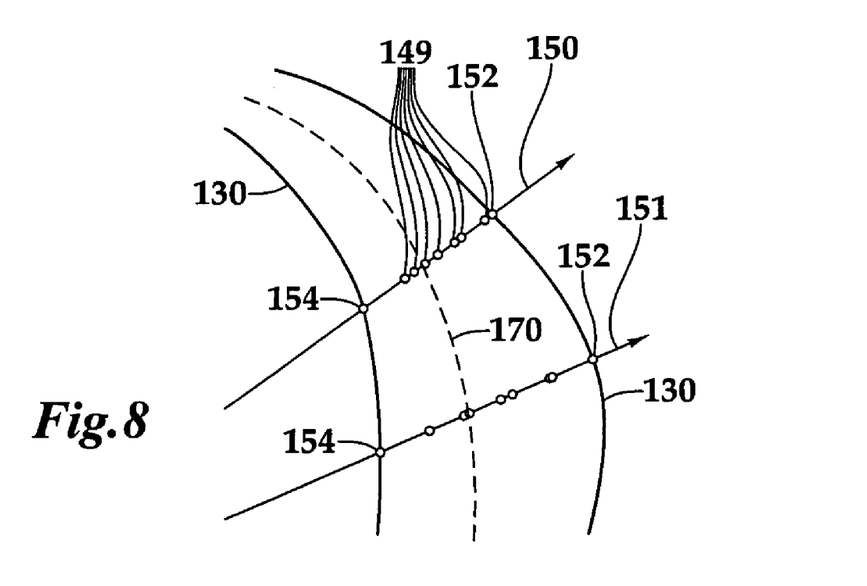
FIG. 8 is an example of the slices of FIG. 7 with one embodiment of a resultant percentile envelope.

Process scans to create envelopes 170. This process may be automated and the resulting envelope files may be stored as DXF polygons. FIG. 6 illustrates two rays 150, 151 near the back of the head scans 130 intersecting the plurality of scans 130 at multiple locations 149 along the rays 150, 151. FIG. 7 shows these two rays 150, 151 in greater detail and further illustrates that surfaces 130A, 130B, 130C, etc. on the same scan may not necessarily occupy the same positions relative to the mesh origin 142 (not shown) at different ray intersections 147. Once the percentiles have been calculated, a desired percentile envelope 170 may be created, such as the one represented by the dashed lines in FIGS. 8 & 1.

Import envelopes into CAD software and compare 99 envelopes to existing product surfaces.

Design 92 mask perimeters (front views) that offer the best chance of a good seal. Factors that may be considered may include minimizing envelope separation and avoiding problem areas where the seal is typically lost, which may be known or verified through testing, experience, or other methods known in the art.

Project 94 the mask perimeter outlines onto the envelope surfaces 170. For each size designed, the perimeter height may match the height used to generate the envelopes.

If desired, create 96 a cleaned-up surface of contact. This may be based on one of the percentile envelopes 70, a surface offset from an envelope, or designed from scratch using the envelopes 70 as guides, references, or other inspiration. For example, in the case of a respirator mask, it may be advantageous if the sealing surface is smooth and symmetrical. The surface may be massaged to provide more or less compression in certain places. For a sealing fit, such as a respirator mask, the lowest percentile envelope surface 70 may serve as the starting point for the surface of contact. The lowest percentile surface 70 should generally always contact tissue and provide some compression of either tissue or mask. Further, an offset of the low percentile may be used to provide some minimum compression, depending on the nature of the seal desired.

Create 90 a 3D curve representing the intersection of the mask perimeter and the designed contact surface. Use this 3D curve to generate sealing mask geometry based on seal cross sections.

Although sealing may be a primary concern, the higher percentile envelopes 70 may still be useful. Since the mask not only may need to seal over a user's face but clear the user's nose and other facial features, the higher percentile envelopes 70 may be used to design surfaces that are intended to clear without touching, such as the outer cup of a mask. As with the inner surfaces, these may be cleaned-up or otherwise altered to meet the desired design characteristics.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A method of surface analysis, comprising:
    establishing a first reference point on each one of a plurality of input surfaces, said plurality of input surfaces comprising input data;
    transforming said input data to orient said input surfaces relative to said first reference point establishing an origin;
    generating a plurality of rays extending from said origin;
    calculating intersections of said plurality of rays with said input surfaces, wherein each of said rays intersects a plurality of said input surfaces;
    calculating distances from said origin to said intersections;
    calculating percentiles based on said intersections along each of said plurality of rays; and
    generating a surface using said percentiles.

2. A method according to claim 1, further comprising:
    establishing a second reference point on each one of said input surfaces.

3. A method according to claim 1, wherein said origin is located within each of said input surfaces.

4. A method according to claim 1, further comprising:
    establishing is second origin;
    generating a second plurality of rays extending from said second origin;
    calculating second intersections of said second plurality of rays with said input surfaces;
    calculating distances from said second origin to said second intersections;
    calculating second percentiles based on said second intersections along each of said second plurality of rays; and
    refining said generated surface using said second percentiles.

5. A method according to claim 1, wherein each of said input surfaces comprises a plurality of polygons.

6. A method according to claim 5, wherein each one of said plurality of rays intersects one of said plurality of polygons.

7. A method according to claim 1, wherein said generated surface comprises a plurality of polygons formed by the intersections calculated for a predetermined percentile.

8. A method according to claim 1, wherein said input surfaces represent body surfaces.

9. A method according to claim 8, wherein said body surfaces are selected from a predetermined subpopulation.

10. A method according to claim 1, wherein said plurality of rays extend in at least two dimensions and are generally equally spaced about said origin.

11. A method according to claim 1, further comprising:
designing an apparatus having dimensions spaced a predetermined distance from said generated surface.

12. A method for designing an apparatus requiring clearance or sealing, comprising:
transforming a first plurality of polygons comprising discrete data points from a plurality of sources to provide a common orientation;
establishing a common origin for each of said plurality of sources;
generating a mesh surface spaced a predetermined distance from said common origin comprising a second plurality of polygons;
extending a plurality of rays from said common origin through said second plurality of polygons to a plurality of intersections with said first plurality of polygons for each of said plurality of sources;
calculating distances between each of said plurality of intersections and said common origin for each of said plurality of sources;
comparing said distances for each of said plurality of rays and calculating threshold values;
designing said apparatus to have dimensions related to said threshold values.

13. A method according to claim 12, wherein said second plurality of polygons of mesh surface have sides comprising a first curved line spaced from said origin and incrementally rotated about an axis passing through said origin and a plurality of second curved lines incrementally spaced from each other and normal to said first curved line.

14. A method according to claim 12, further comprising sorting said plurality of intersections for each of said plurality of rays by said distances.

15. A method according to claim 12, wherein said calculating step comprises computing percentiles for said distances and selecting at least one of said percentiles to be a threshold value.

16. A system for designing an apparatus for use by a population, comprising:
a device for scanning surfaces;
a product fit, plan executable by a computer, to assist in data transformation between scanned surfaces and said apparatus;
a coordinate transformation algorithm performed by a computer;
an envelope processor executable by said computer for analyzing data sets and generating output surfaces, said processor comprising an intersection calculation algorithm; and an output file generated by said computer that includes data corresponding to said output surfaces;
wherein said intersection calculation algorithm includes calculating intersections of a plurality of rays emanating from an origin with said surfaces, each of said rays intersecting a plurality of said surfaces; and
wherein said intersection calculation algorithm further includes calculating distances from said origin to said intersections.

17. A system according to claim 16, further comprising a conversion module for converting files into a format usable by said envelope processor.

18. A system according to claim 16, further comprising a database of ray mesh files.

19. A system according to claim 16, wherein said output file is of a format readable by CAD software for displaying said output file graphically.

20. A system according to claim 16, further comprising an algorithm for smoothing said output surfaces.

* * * * *